Patented Aug. 15, 1933

1,922,695

UNITED STATES PATENT OFFICE 1,922,695

MANUFACTURE OF PHENYL PHENOLS

William J. Hale, Midland, Mich., assignor to The Dow Chemical Company, Midland, Mich., a Corporation of Michigan No Drawing. Application December 18, 1930
Serial No. 503,234

8 Claims. (Cl. 260—154)

The present invention relates to methods for making phenyl phenols. It is known that phenyl phenols, e. g. ortho- and para-phenyl phenol, are produced in small amount as by-products in the process for making phenol by heating a mono-halogenated benzene under pressure with an aqueous alkali metal hydroxide solution (cf. Ind. Eng. Chem. 20; 114). In a co-pending joint patent application of the present inventor and E. C. Britton, Serial No. 425,347, filed February 1, 1930, now Patent No. 1,907,246, certain conditions tending to promote the secondary formation of phenyl phenols in the aforementioned process are more particularly set forth. Said process, specifically stated, consists in mixing chlorobenzene with an excess of sodium hydroxide solution over that required by the equation;

(1) $C_6H_5Cl + 2NaOH \rightarrow C_6H_5ONa + NaCl + H_2O$ and heating the mixture under pressure at a temperature between about 340° and 400° C. Two molecular equivalents of sodium hydroxide to one of chlorobenzene are theoretically required, but in practice from 2¼ to 3 equivalents are used, this having been found to give the highest yield of phenol under the usual reaction conditions. In other words, the reaction mixture is maintained strongly alkaline.

The formation of phenyl phenols in the aforesaid phenol process has been shown to result from the direct reaction of part of the sodium phenate product, which is believed to exist in a tautomeric keto form under the conditions obtained in the reaction mixture, with unreacted chlorobenzene, as represented by the equation;

(2) $C_6H_5ONa + C_6H_5Cl \rightarrow C_6H_5.C_6H_4OH + NaCl$

In the presence of an excess of sodium hydroxide, of course, such phenyl phenols are not obtained directly, but the corresponding sodium phenyl phenates are formed in the reaction mixture, from which the free phenols are liberated subsequently by acidification. As disclosed in the co-pending application above referred to, the amount of phenyl phenols formed under different conditions of temperature and concentration suitable for the principal reaction varies from about 5 per cent of the total phenol product to as much as 15 to 20 per cent thereof, but it has not been found possible to raise the yield of phenyl phenols beyond the latter figure under the reaction conditions maintained in the direct hydrolysis of chlorobenzene with sodium hydroxide solution.

I have now found that a materially higher yield of phenyl phenols may be obtained by reacting chlorobenzene directly with an aqueous sodium phenate solution in the presence of free phenol, whereby an acid, rather than an alkaline, condition is maintained for the reaction. The invention, then, consists of the steps hereinafter fully described and particularly pointed out in the claims, the following description setting forth but a few of the ways in which the principle of the invention may be used.

In carrying out my invention, chlorobenzene is introduced under pressure into an aqueous sodium phenate solution containing free phenol which has been previously heated in an autoclave to the reaction temperature between about 350° and 420° C. The concentration of the sodium phenate solution employed is advantageously between about 12 and 25 per cent, to which solution free phenol is added, an excess of the solution relative to the chlorobenzene being preferably employed for the reaction. Advantageously, the individual reactants, e. g. chlorobenzene and sodium phenate-phenol solution, are heated separately to about reaction temperature before mixing. The products of the reaction are chiefly phenyl phenols, i. e. a mixture of the ortho- and para-isomers, and diphenyl oxide, in the proportion of about 1 mol. of phenyl phenols to 3 mols. of diphenyl oxide. The excess of sodium phenate present tends to hydrolyze the diphenyl oxide to free phenol, and thus to limit the amount of diphenyl oxide in the product. Sodium carbonate or other alkali metal salt of a weak acid, e. g. borax, sodium phosphate, etc., may be used to replace all or a part of the excess of sodium phenate taken for the reaction, since basic salts of that character are capable of hydrolyzing diphenyl oxide to phenol. When bromobenzene is employed, instead of chlorobenzene, the reaction time is shortened materially and a higher yield of phenyl phenol as compared to diphenyl oxide results. Instead of sodium phenate, potassium phenate may be employed as a substantial equivalent.

The function of free phenol in the reaction mixture is believed to consist, at least in part, in increasing the solubility of chlorobenzene in the aqueous phenate solution, thereby facilitating the desired reaction. In some cases, however, the initial addition of free phenol to the reaction mixture may be dispensed with, if a sufficient excess of sodium phenate or equivalent basic salt is present, since the basic salt will hydrolize diphenyl oxide formed to produce a component of free phenol in the mixture which then acts in the manner already described. Such hydrolysis of diphenyl oxide, however, proceeds relatively slowly as compared with the reaction between chlorobenzene and sodium phenate, hence it will be usually preferable to add the desired amount of phenol to the original reaction mixture.

As already stated, the phenyl phenol product of the reaction consists of a mixture of the ortho- and para-compounds. The relative proportions of the two may vary more or less, depending upon the reaction conditions. Within the ranges of temperature, concentration and other conditions hereinbefore mentioned, the formation of the para-compound in predominating amount is favored by lower temperatures and concentrations, while the greater proportionate formation of the ortho-compound accompanies higher temperatures and concentrations.

As an example of the results obtained by carrying out the reaction between chlorobenzene and sodium phenate without the presence of free phenol, the following is cited:—

Example 1

A 25 per cent aqueous sodium phenate solution was heated under pressure in an autoclave to 380° C., and chlorobenzene separately heated to about the same temperature was then introduced in proportion of 1 mol. thereof to 2 mols. of sodium phenate. The mixture was maintained at about 380° C. for ½ hour, with agitation. The reaction product was then discharged and, upon cooling, treated with sufficient sodium hydroxide solution to dissolve all phenols. The aqueous alkaline solution was then separated from the oil layer containing diphenyl oxide and unreacted chlorobenzene, the latter being distilled to separate the constituents. The aqueous layer was acidified, extracted with benzene, and the benzene solution distilled to separate solvent, phenol and phenyl phenols. Of the chlorobenzene used, 84.3 per cent was reacted, and the yield of phenyl phenols was 0.172 mol. per mol. of chlorobenzene reacted. This corresponds to a good yield of phenyl phenols as obtained from the direct reaction of chlorobenzene and sodium hydroxide solution under the most favorable conditions for formation of phenyl phenols as secondary products therein.

To illustrate the improvement realized by adding free phenol to the reaction mixture in accordance with the present invention, the following examples are given:—

Example 2

A solution was prepared by adding 282 grams (3 mols.) phenol to 320 grams of a 25 per cent sodium hydroxide solution (2 mols. of NaOH), thus providing an excess of 1 mol. of phenol in an aqueous solution containing 2 mols. of sodium phenate. The solution was heated in an autoclave to 380° C., and 56.25 grams (½ mol.) of chlorobenzene, similarly preheated, was introduced. The reaction was carried out at about 380° C. for ½ hour, and the product worked up as already described. The percentage of chlorobenzene reacted was 84.7 per cent. A yield of 20 grams of phenyl phenols (0.118 mol.) was obtained, which is equal to 0.28 mol. of phenyl phenols per mol. of chlorobenzene reacted, a gain of 63 per cent over Example 1.

Example 3

In this example, bromobenzene was substituted for chlorobenzene, 1 mol. thereof being added to a solution containing 3 mols. of sodium phenate, ½ mol. of sodium carbonate and 3 mols. of phenol, previously heated to a temperature of 380° C. The reaction was continued for ¼ hour at 380° C., and the product worked up as before. Of the bromobenzene taken 58.4 per cent was reacted, and 0.238 mol. of phenyl phenols was obtained, corresponding to 0.40 mol. of phenyl phenols per mol. of bromobenzene reacted.

The foregoing examples show the materially increased yield of phenyl phenols obtained by reacting chlorobenzene, or equivalent monohalogenated benzene, with an aqueous alkali metal phenate solution containing free phenol at a temperature between about 350° and 420° C. and corresponding pressure. Instead of treating the reaction product with alkali metal hydroxide in working up the same to recover the products separately, as just described, the mixture may be allowed to separate directly into an oil and a water layer without such addition of alkali. The phenyl phenols produced and excess phenol may be recovered from the oil layer by distillation or otherwise, while the aqueous solution containing sodium phenate may be used for a succeeding reaction, if desired, either with or without an intermediate concentration to crystallize out sodium chloride present therein.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of making phenyl phenols which comprises introducing a monohalogenated benzene into a hot aqueous alkali metal phenate solution containing phenol maintained under pressure at a temperature between 350° and 420° C. and separating phenyl phenols from the product.

2. The method of making phenyl phenols which comprises separately heating a monohalogenated benzene and an aqueous alkali metal phenate solution containing phenol to a temperature between 350° and 420° C. under pressure, mixing the hot liquids to cause reaction therebetween and separating phenyl phenols from the product.

3. The method of making phenyl phenols which comprises introducing cholobenzene into a hot aqueous sodium phenate solution containing phenol maintained under pressure at a temperature between 350° and 420° C. and separating phenyl phenols from the product.

4. The method of making phenyl phenols which comprises separately heating chlorobenzene and an aqueous sodium phenate solution containing phenol under pressure to a temperature between 350° and 420° C., mixing the hot liquids to cause reaction therebetween and separating phenyl phenols from the product.

5. The method of making phenyl phenols which comprises introducing chlorobenzene into a hot aqueous solution containing in excess of one molecular equivalent of sodium phenate and also some free phenol, while maintaining the same under pressure at a temperature between 350° and 420° C., and separating phenyl phenols from the reaction product.

6. The method of making phenyl phenols which comprises preparing an aqueous solution containing sodium phenate and phenol in molecular proportion of approximately two to one, heating the same under pressure to a temperature between 350° and 420° C., separately heating chlorobenzene to about the same temperature, introducing about one molecular proportion of such hot chlorobenzene into said hot solution to cause reaction therebetween while maintaining the stated temperature, and separating phenyl phenols from the reaction product.

7. The method of making phenyl phenols which comprises heating under pressure an aqueous solution of an alkali metal phenate containing free phenol to a temperature between about 350° and about 420° C., adding a monohalogenated benzene in less than equimolecular proportion to the phenate, while maintaining the temperature of the mixture substantially between the stated limits during such addition and in the ensuing reaction, and separating phenyl phenols from the reaction product.

8. The method of making phenyl phenols which comprises heating under pressure an aqueous sodium phenate solution containing free phenol to a temperature between about 350° and about 420° C., adding chlorobenzene in less than equimolecular proportion to the phenate, while maintaining the temperature of the mixture substantially between the stated limits during such addition and in the ensuing reaction, and separating phenyl phenols from the reaction product.

WILLIAM J. HALE.